United States Patent
Estes et al.

(10) Patent No.: US 9,250,974 B1
(45) Date of Patent: Feb. 2, 2016

(54) SYSTEMS AND METHODS FOR CONFIGURING AND MANAGING COMPUTING RESOURCES TO PROVIDE HIGHLY-SCALABLE SERVICES

(75) Inventors: Matt Estes, Olalla, WA (US); Joe F. Heck, II, Seattle, WA (US); Adam Fritz, Seattle, WA (US); Lance Galey, Sammamish, WA (US); David Snelling, Bellevue, WA (US); Scott Thompson, Bellevue, WA (US)

(73) Assignee: Disney Enterprises, Inc., Burbank, CA (US)

( * ) Notice: Subject to any disclaimer, the term of this patent is extended or adjusted under 35 U.S.C. 154(b) by 552 days.

(21) Appl. No.: 12/904,044

(22) Filed: Oct. 13, 2010

Related U.S. Application Data (60) Provisional application No. 61/381,037, filed on Sep. 8, 2010.

(51) Int. Cl.
*G06F 9/50* (2006.01)

(52) U.S. Cl.
CPC .............. *G06F 9/5072* (2013.01); *G06F 9/5083* (2013.01)

(58) Field of Classification Search
CPC .............................. G06F 9/5072; G06F 9/5083
USPC .......................................................... 709/226
See application file for complete search history.

(56) References Cited

U.S. PATENT DOCUMENTS

| | | | |
|---|---|---|---|
| 8,098,658 B1 * | 1/2012 | Ranganathan et al. | 370/389 |
| 2010/0211669 A1 * | 8/2010 | Dalgas et al. | 709/224 |
| 2010/0262695 A1 * | 10/2010 | Mays et al. | 709/226 |
| 2011/0029673 A1 * | 2/2011 | Jaisinghani | 709/226 |
| 2011/0078303 A1 | 3/2011 | Li et al. | |
| 2011/0125894 A1 * | 5/2011 | Anderson et al. | 709/224 |
| 2011/0161496 A1 | 6/2011 | Nicklin | |
| 2011/0191781 A1 | 8/2011 | Karanam et al. | |
| 2011/0295999 A1 * | 12/2011 | Ferris et al. | 709/224 |
| 2012/0005263 A1 | 1/2012 | McWhirter et al. | |
| 2012/0042076 A1 | 2/2012 | Kawa et al. | |
| 2012/0054332 A1 | 3/2012 | Sahu et al. | |

OTHER PUBLICATIONS

U.S. Appl. No. 12/904,066, entitled Systems and Methods for Configuring and Managing Computing Resources to Provide Highly-Scalable Services, filed Oct. 13, 2010.

U.S. Appl. No. 12/904,068, entitled Systems and Methods for Configuring and Managing Computing Resources to Provide Highly-Scalable Services, filed Oct. 13, 2010.

U.S. Appl. No. 12/904,062, entitled Systems and Methods for Configuring and Managing Computing Resources to Provide Highly-Scalable Services, filed Oct. 13, 2010.

* cited by examiner

*Primary Examiner* — Suraj Joshi

(74) *Attorney, Agent, or Firm* — Patterson + Sheridan, LLP (57) ABSTRACT

One embodiment of the present invention sets forth a cloud computing environment that includes a service cloud and one or more services accessing the service cloud. The service cloud includes multiple resources of different types that support the execution of the services accessing the service cloud. Each resource and service in the cloud computing environment is configured via a centralized configuration service. In addition, resource allocation and predictive performance monitoring engines allocate resources and monitor the resources allocated to the services accessing the service cloud.

20 Claims, 10 Drawing Sheets

HIGH-LEVEL ARCHITECTURE

FIGURE 1

SERVICE DESIGN

PREDICTIVE ENGINE DESIGN

SYSTEMS AND METHODS FOR
CONFIGURING AND MANAGING
COMPUTING RESOURCES TO PROVIDE
HIGHLY-SCALABLE SERVICES

CROSS-REFERENCE TO RELATED
APPLICATIONS

This application claims benefit of United States provisional patent application entitled "Systems and Methods for Configuring and Managing Computing Resources to Provide High-Scalable Services" filed on Sep. 8, 2010 and having a Ser. No. 61/381,037.

BACKGROUND OF THE INVENTION

1. Field of the Invention

The present invention relates generally to online commerce and, more specifically, to systems and methods for configuring and managing computing resources to provide highly-scalable services.

2. Description of the Related Art

The advent of cloud-based computing architectures has allowed for the rapid and scalable deployment of services, such as virtual stores, media outlets, and other online services. In general, a cloud-based architecture includes a set of resources such as processors, operating systems, software and other components that can be combined to form systems on which services can be deployed.

A user can request the instantiation of specific set of resources from a management system to deploy a service. For example, a user may wish to set up and instantiate a virtual server from the cloud to create a storefront to market products or services on a temporary basis, for instance, to sell tickets to an upcoming sports or musical performance. In a typical cloud-based architecture, the user needs to be aware of the specific resources that are needed to deploy a service from the initial stages of service development. The service is often developed in a manner that is closely dependent or coupled to the specific resources on which the service is to be deployed. In addition, to deploy a service, the user typically configures the specific resources based on the configuration requirements of the service.

One drawback to such cloud-based architectures is that the user spends a considerable amount of time on the infrastructure level details, such as configuration, when deploying the service in the cloud. In addition, since the service is developed according to the specific resources and not in a generic manner, the development cycles for developing services that can be deployed on such cloud-based architectures is undesirably long.

As the foregoing illustrates, what is needed in the art is a mechanism for deploying and managing services in a cloud with minimal effort from service developers.

SUMMARY OF THE INVENTION

One embodiment of the present invention sets forth a computer-implemented method for allocating one or more resources to a service that accesses a cloud computing environment. The method includes the steps of, based on configuration information associated with the service, determining one or more resource types necessary for the service to operate, identifying one or more performance requirements specified by the service, where each performance requirement is associated with a different performance metric, and allocating a set of resources included in the cloud computing environment to the service based on the one or more performance requirements, where at least a first resource in the set of resources is of a first resource type included in the one or more resource types.

Advantageously, the cloud computing environment described herein allows service developers to simply define the functionality of the service and describe the operating characteristics of the service. The allocation, configuration and management of the resources and the services are then autonomously performed by engines within the cloud computing environment.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
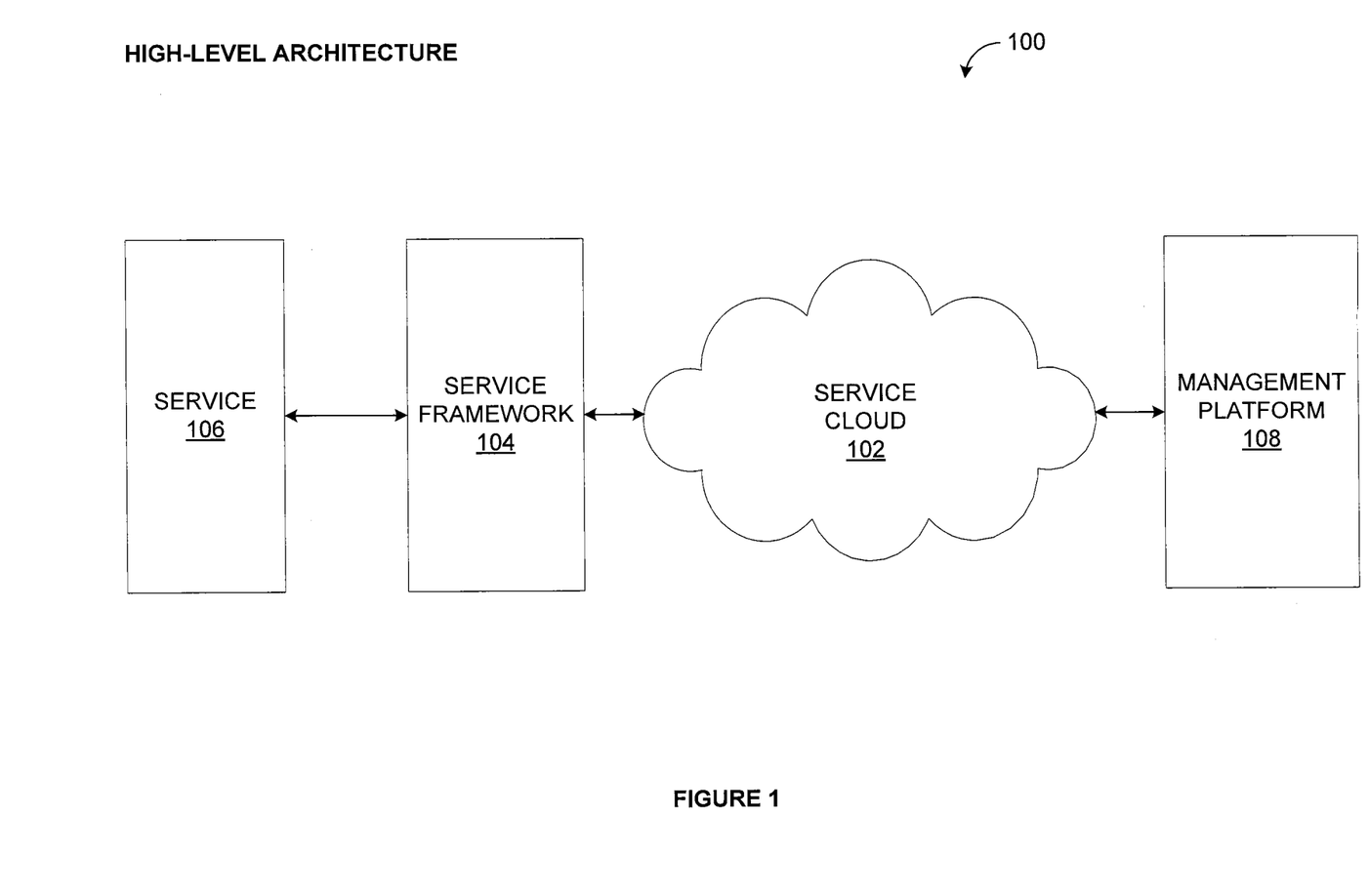
FIG. 1 illustrates a cloud computing environment configured to implement one or more aspects of the invention.

FIG. 1 illustrates a cloud computing environment 100 configured to implement one or more aspects of the invention. As shown, the cloud computing environment 100 includes a service cloud 102, a service framework 104, services 106 and a management platform 108.

The service cloud 102 includes a collection of resources, such as hardware resources, platform resources and infrastructure resources, that are configured and managed by different engines within the service cloud 102. The service cloud 102 also manages the allocation of the resources to services, such as service 106, interacting with the service cloud 102. Further, the service cloud 102 monitors the performance of the different resources included in the service cloud 102 as well as the services interacting with the service cloud 102. In one embodiment, the service cloud 102 communicates with other collections of resources, such as an external cloud, to provide a wider array of resources that can be allocated to the services. Additional details of the service cloud 102 including the resource configuration, resource allocation and monitoring functionalities are set forth below in conjunction with FIG. 4.

The service framework 104 is an interface layer between the service 106 and the service cloud 102. In one embodiment, the service framework 104 allows the service 106 interact to the service cloud 102 via an abstracted application program interface (API). The service 106 is designed and developed to seamlessly interact with the interface provided by the service framework 104. Additional details of the service framework 104 are set forth below in conjunction with FIG. 3.

The service 106 is any application that interacts with the cloud service 102 to utilize processing capabilities and/or infrastructure and platform resources provided by the cloud service 102. For example, the service 106 may be an entertainment distribution service, a news service or a financial management service. In one embodiment, the service 106 is distributed to one or more end-users via the cloud service 102. The service 106 can be developed in any technically feasible fashion and in any software programming language as long as the service 106 is able to interact with the service framework 104. Importantly, since the service 106 interacts only with the service framework 104, the service 106 does not need to be developed with any knowledge of the specific functionalities and resources provided by the service cloud 102. Additional details of the service framework 104 are set forth below in conjunction with FIG. 2.

The management platform 108 allows service and network administrators to monitor the performance of resources within the service cloud 102 as well as the services interacting with the service cloud 102. The management platform 108 also allows service and network administrators to perform various management tasks when needed. For example, a service administrator, via the management platform 108, may be able to view any captured log data that indicates performance characteristics services interacting with the service cloud 102. As another example, a service administrator, via the management platform 108, may view or modify configuration information associated with a service interacting with the service cloud 102.

Although, in the above description, the cloud computing environment 100 is shown with one service 106 and one service framework 104, persons skilled in the art will recognize that the architecture of FIG. 1 contemplates only an exemplary embodiment of the invention. Other embodiments may include any number of services 106 and any number of service frameworks 104. Thus, FIG. 1 is in no way intended to limit the scope of the present invention in any way.

Figure 2:
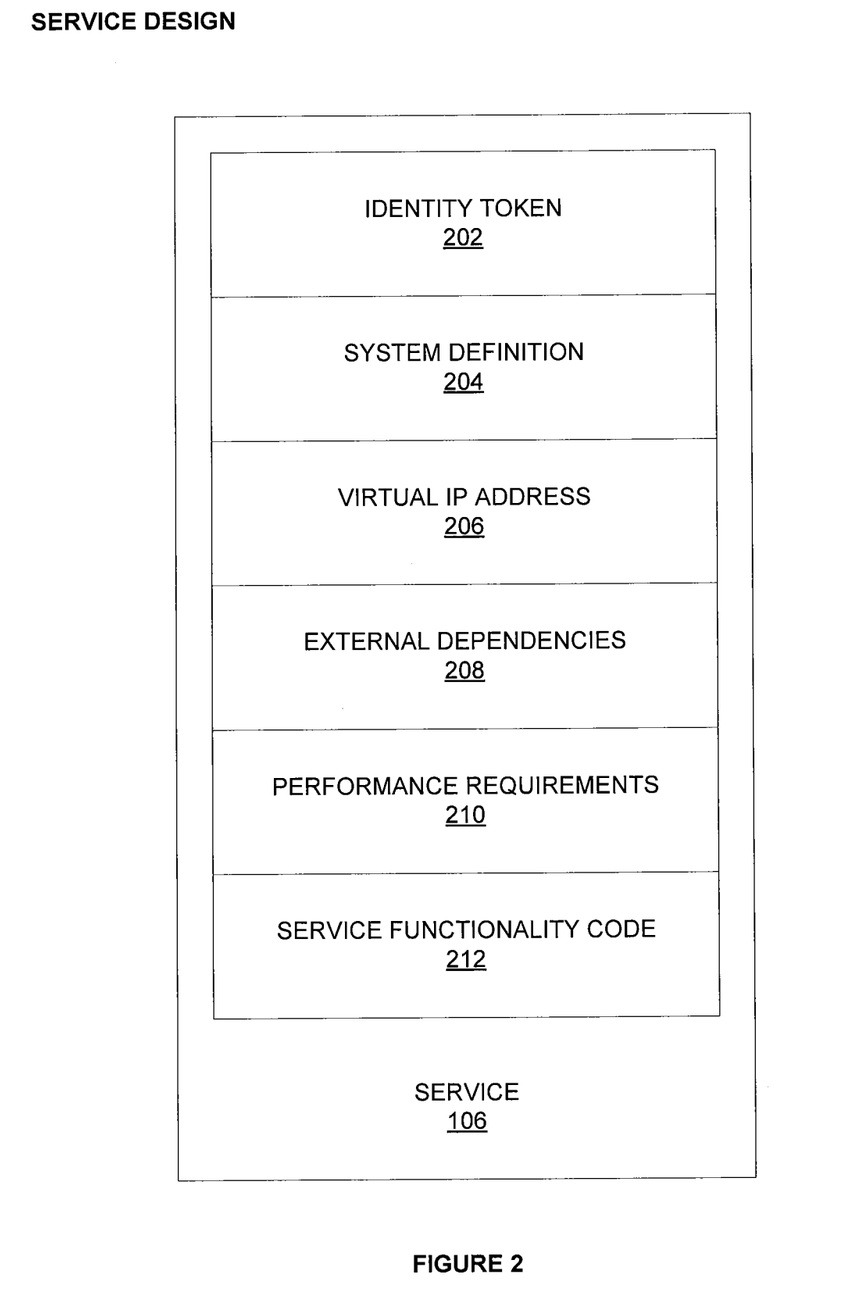
FIG. 2 is a more detailed illustration of the service of FIG. 1, according to one embodiment of the invention.

FIG. 2 is a more detailed illustration of the service 106 of FIG. 1, according to one embodiment of the invention. As shown, the service 106 includes an identity token 202, a system definition 204, a virtual internet protocol (IP) address 206, external dependencies 208, performance requirements 210 and service functionality code 212.

The identity token 202 within the service 106 is a unique key assigned to the service 106 by the service cloud 102. Based on the identity token 202, the service 106 is authenticated with the service cloud 102 and is able to receive configuration information from the service cloud 102 via the service framework 104. In one embodiment, two or more instances of the service 106 are interacting with the service cloud 102. In such an embodiment, a different identity token 202 is assigned to each instance of the service 106.

As previously described herein, the service 106 interacts only with the service framework 104 and does not have any knowledge of the specific functionalities and resources provided by the service cloud 102. Instead, the service 106 defines the types of resources that are needed by the service 106 to operate and to be accessed by end-users. The system definition 204 included in the service 106 defines the type of system the service 106 needs to operate. More specifically, the system definition 204 specifies the hardware requirements as well as the operating system requirements for operating the service 106. Any other system-level requirements or specifications associated with the service 106 are included in the system definition 204. The virtual IP address 206 specifies a virtual IP address associated with the service 106. The virtual IP address 206 is a public-facing address that can be used by end-users to access the service 106.

The external dependencies 208 included in the service 106 specify the types of external resources that are needed for the service 106 to operate. These external resources are external to the system on which the service 206 operates. External resources specified by the service 106 in the external dependencies 208 may include specific data stores, application servers, legacy systems, federation servers, virtualization servers, etc.

The performance requirements 210 included in the service 106 specify thresholds related to specific performance metrics that the service 106 should meet when the service 106 operates. The performance requirements 210 may specify different thresholds for data throughput, latency and resource utilization. As described below, the service cloud 102 allocates resources to the service 106 based on the performance requirements 210.

The service functionality code 212 is software code that defines the function of the service 106. The service functionality code 212 can be written in any technically feasible manner and in any programming language. When the service 106 interacting with the service cloud 102 is accessed by end-users, the service functionality code 212 is executed to provide the end-users with the functionality associated with the service 106.

Figure 3:
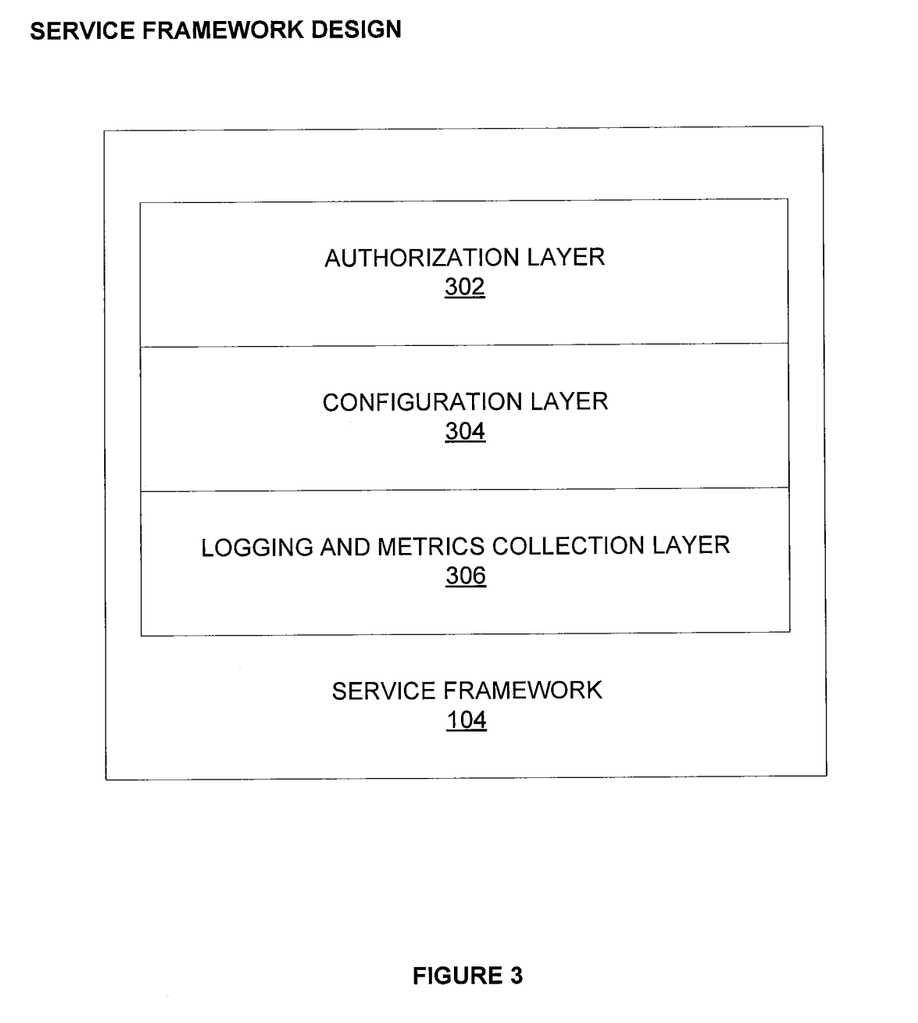
FIG. 3 is a more detailed illustration of the service framework of FIG. 1, according to one embodiment of the invention.

FIG. 3 is a more detailed illustration of the service framework 104 of FIG. 1, according to one embodiment of the invention. As shown, the service framework 104 includes an authorization layer 302, a configuration layer 304 and a logging and metrics collection layer 306.

As previously described herein, the service framework 104 is an interface layer between the service 106 and the service cloud 102. More specifically, the service 106 is developed such that any interactions between the service 106 and the service cloud 102 are performed via the different layers included in the service framework 104. The authorization layer 302 interfaces between the service 106 and the service cloud 102 when the service 106 needs to be authorized. In operation, the service 106, via the authorization layer 302, transmits the identity token 202 to the service cloud 102 and receives, again, via the authorization layer 302, an indication whether the authorization with the service cloud 102 based on the identity token 202 was successful.

The configuration layer 304 interfaces between the service 106 and the service cloud 102 when the service 106 needs to receive configuration information associated with the service 106. As will be discussed in greater detail below, configuration information associated with each service, such as the service 106, is stored in the service cloud 102. Among other information, the configuration information associated with the service 106 includes the back-end resource configuration associated with the service 106. When the service 106 is ready to receive the associated configuration information, a request is transmitted to, the service cloud 102 via the configuration layer 304. In response, the service 106 receives the associated configuration information, again, via the configuration layer 304.

The logging and metrics collection layer 306 interfaces between the service 106 and the service cloud 102 to collect operating details associated with the service 106. The operating details collected by the logging and metrics collection layer 306 include logs and metrics associated with the performance of the service 106, end-user and resource usage patterns associated with the service 106, periodic environment snapshots, etc. The operating details collected by the logging and metrics collection layer 306 are stored in and analyzed by the service cloud 102 as described in greater detail below.

Figure 4:
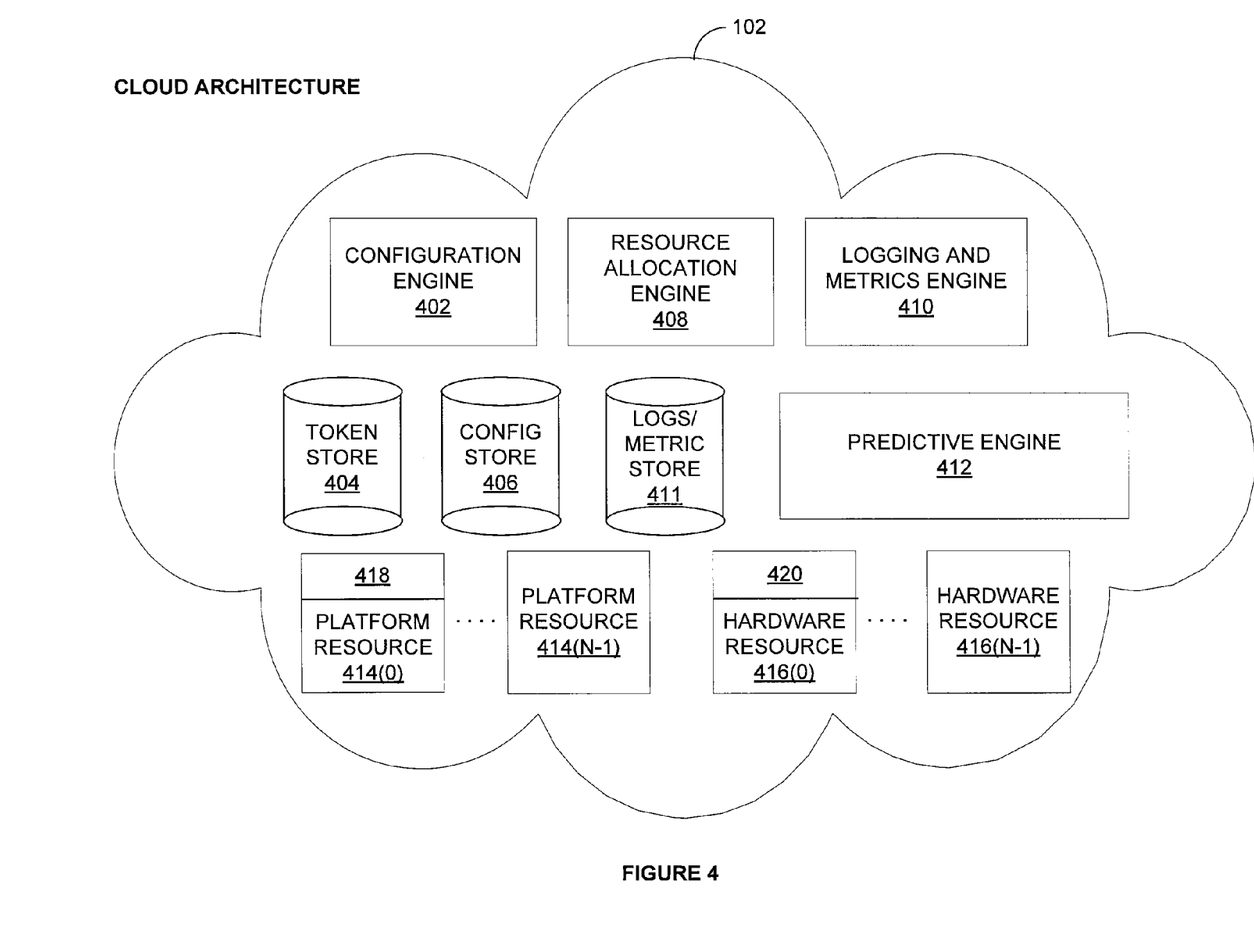
FIG. 4 is a more detailed illustration of the service cloud of FIG. 1, according to one embodiment of the invention.

FIG. 4 is a more detailed illustration of the service cloud 102 of FIG. 1, according to one embodiment of the invention. As shown, the service cloud 102 includes a configuration engine 402, a token store 404, a configuration store 406, a resource allocation engine, a logging and metrics engine 410, a predictive engine 412, platform resources 414 and hardware resources 416.

As previously described herein, the service cloud 102 provides an infrastructure of resources to services, such as the service 106, that interact with the service cloud 102. The services interacting with the service cloud 102 utilize the processing capabilities and functionalities of the resources to operate and distribute service functionality to end-users. The service cloud 102 includes several management engines, the configuration engine 402, the resource allocation engine 408 and the predictive engine 412, that manage and monitor the infrastructure of resources provided by the service cloud 102 to facilitate the efficient and reliable operation of the services interacting with the service cloud 102. For exemplary purposes only, the specific operation of the management engines included in the service cloud 102 are described below with respect to the service 106.

The infrastructure of resources provided by the service cloud 102 includes the platform resources 414 and the hardware resources 416. Platform resources 414 include operating system resources, virtual machine resources, database resources, etc. Hardware resources 416 include servers, routers, storage space, etc. Each platform resource 414 and hardware resource 416 is associated with a resource type and a unique identity token, such as identity token 418 associated with platform resource 414(0) and identity token 420 associated with hardware resource 416(0). A resource type associated with a resource indicates the specific functionalities or processing capabilities of the resource. For example, a resource type associated with a platform resource indicates that the platform resource is a database from a specific vendor. As another example, a resource type associated with a hardware resource indicates that the hardware resource is a server having a certain processing power. Resources associated with the same resource type can be co-located or sparsely located, can belong to different organizations, and can be purchased from different vendors.

The platform resources 414 and the hardware resources 416, or portions thereof, are allocated to different services that interact with the service cloud 102 by the resource allocation engine 408. For a particular service, the resource allocation engine 408 allocates resources included in the service cloud 102 based on the resource requirements specified by the service. When allocating resources to the service 106, the resource allocation engine 408 first identifies the system definition 204, the external dependencies 208 and the performance requirements 210 specified by the service 106. As previously described herein, the service 106, via the system definition 204, the external dependencies 208 and the performance requirements 210, specifies the types of resources that are needed by the service 106 to operate efficiently. The resource allocation engine 408 then identifies one or more platform resources 414 and/or one or more hardware resources 416 (referred to herein as "the identified resources") that match the types of resources specified by the service 106. For example, the system definition 204 may specify that the service 106 requires a particular type of operating system, and the resource allocation engine 408 identifies a platform resource 414 that is an operating system of the particular type specified by the system definition 204.

From the identified resources, the resource allocation engine 408 selects the particular resources that meet the performance requirements specified by the performance requirements 210 of the service 106. When selecting the particular resources, the resource allocation engine 408, based on the performance requirements 210, may implement one of several resource allocation algorithms. When the performance requirements 210 specify that resource availability should be maximized, the resource allocation engine 408 performs resource allocation according to a location sparsity algorithm. With location sparsity algorithms, resources within the identified resources that are sparsely located relative to each other are typically selected. One implementation of the location sparsity algorithm is described below in conjunction with FIG. 7B. When the performance requirements specify that latency across the service 106 should be minimized, the resource allocation engine 408 performs resource allocation according to a location density algorithm. With location density algorithms, resources within the identified resources that are close in proximity relative to each other are typically selected. One implementation of the location density algorithm is described below in conjunction with FIG. 7C.

Another resource allocation algorithm that may be implemented by the resource allocation engine 408 is the load balancing algorithm. With load balancing algorithms, resources are typically allocated such that resources associated with the same resource type have balanced utilization levels. In addition, the performance requirements 210 may specify that only resources having a utilization level below a pre-determined threshold are to be allocated to the service 106. In such a scenario, any identified resources that do not have a utilization level below the pre-determined threshold are not be allocated to the service 106. In other embodiments, any other technically feasible resource allocation algorithms can be implemented by the resource allocation engine 408 to allocate resources based on the performance requirements 210 specified by the service 106.

As the service 106 operates on resources allocated by the resources allocation engine 408, the logging and metrics engine 410 collects operating details associated with the allocated resources and the service 106. The operating details associated with the allocated resources include performance metrics associated with the platform resources 414 and the hardware resources 416, environment snapshots of service cloud 102, resource utilization levels, failure logs, etc. The logging and metrics engine 410 stores the collected operating details in the logs and metrics store 411. In addition, the logging and metrics engine 410 receives operating details collected by the service 106 via the service framework 104, as previously described herein. The operating details collected by the service 106 are also stored in the logs and metrics store 411.

The predictive engine 412 is a learning-based engine that analyzes the operational details stored in the logs and metrics store 411. In the analysis, the predictive engine 412 identifies inefficiencies and usage patterns across the service cloud 102 and predicts future utilization levels of the resources based on pre-determined trends and other historic data. In addition, the predictive engine 412 compares current patterns with predetermined trends to determine the likelihood of certain events, such as failures, across the service cloud 102. Based on the analysis, the predictive engine 412 performs one or more remedial operations to improve the overall performance of the service cloud 102 as well the performance of the services interacting with the service cloud 102. The specific operation of the predictive engine 412 is described in greater detail below in conjunction with FIG. 5.

To realize the functionality of the service cloud 102 described above, each of the resources and the services (referred to herein as "the entities") included in and interacting with the service cloud 102 needs to be configured with the associated configuration information. In addition, the resource allocation engine 408 and the predictive engine 412 described above need access to the configuration information associated with each of the entities to facilitate the efficient operation of the service cloud 102. For a particular entity, the associated configuration information specifies the different functionalities, properties and architectural dependencies associated with the entity. For example, the configuration information associated with a database platform resource specifies the different properties associated with the database, such as access control information, table sizes, etc. The configuration information associated with the database platform resource also specifies the storage hardware resource that stores the data associated with the database.

The configuration engine 402 in conjunction with the token store 404 and the configuration store 406 provide a centralized configuration mechanism for configuring each of the entities. The configuration information associated with each entity is populated and maintained in the configuration store 406 by the configuration engine 402. Within the configuration store 406, configuration information associated with a particular entity is identified by the unique identity token associated with the particular entity. The configuration engine 402 receives requests for configuration information from different entities and, in response, retrieves the associated configuration information from the configuration store 406 and transmits the retrieved configuration information to the associated entities.

In operation, when an entity becomes a part of the service cloud 102 or interacts with the service cloud 102, the configuration engine 402 identifies and generates configuration information associated with the entity for transmission to the entity. When an entity first requests configuration information, the configuration engine 402 identifies the entity type associated with the entity and then generates configuration information for the entity based on default configuration information corresponding to the entity type. The default configuration information is stored in the configuration store 406. The configuration engine 402 also assigns an identity token to the entity that uniquely identifies the entity in the cloud computing environment 100. The identity token is stored in the token store 404.

For subsequent requests for configuration information transmitted by the particular entity, the configuration engine 402 first extracts the identity token included in the request. The configuration engine 402 next validates the identity token included in the request. To validate the identity token, the configuration engine 402 determines whether a record corresponding to the extracted identity token exists within the token store 404. The identity token is validated when a record corresponding to the identity token exists within the token store 404 and the entity associated with the identity token is authorized to receive configuration as specified by the record corresponding to the extracted identity. Once the identity token is validated, the configuration engine 402 retrieves the configuration information associated with the entity from the configuration store 406 based on the identity token. Again, within the configuration store 406, configuration information associated with a particular entity is identified by the unique identity token associated with the particular entity. The configuration information is then transmitted to the requesting entity.

In one embodiment, the configuration engine 402 performs a validation operation on an entity that requests to become a part of the service cloud 102 or interact with the service cloud 102. To perform the validation operation, the configuration engine 402 validates the entity against other entities already a part of the service cloud 102 that have the same entity type. The validation operation may also be performed using a set of pre-defined validation metrics.

In another embodiment, the configuration engine 402 also stores a hierarchy of configuration information. When a request is received for a particular type of resource, the configuration engine 402 is configured to resolve the request using the hierarchy of configuration information to identify the particular entity in the service cloud to which the request is to be transmitted.

Figure 5:
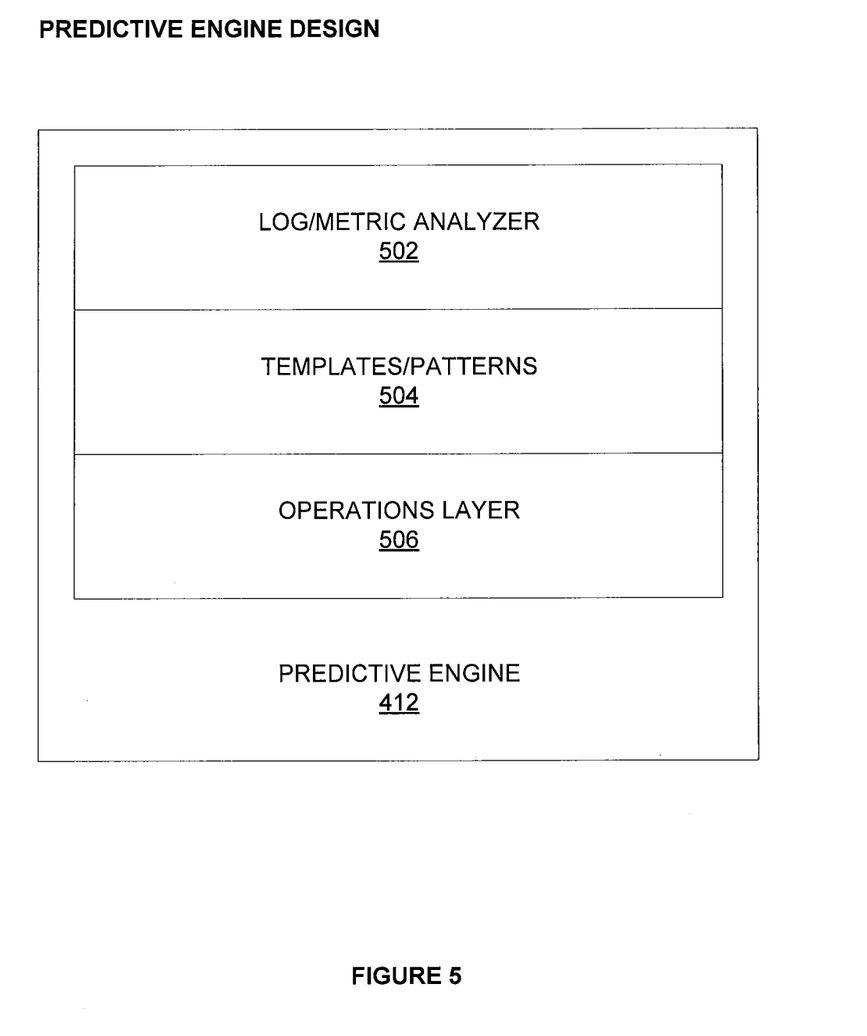
FIG. 5 is a more detailed illustration of the predictive engine of FIG. 4, according to one embodiment of the invention.

FIG. 5 is a more detailed illustration of the predictive engine 412 of FIG. 4, according to one embodiment of the invention. As shown, FIG. 5 includes a log/metric analyzer 503, templates/patterns 504 and an operations layer 506.

As previously described herein, the predictive engine 412 is a learning-based engine that analyzes the operational details stored in the logs and metrics store 411 and, based on the analysis, performs different remedial operations when necessary. The log/metric analyzer 502 included in the predictive engine 412 analyzes the operational details collected by the log/metrics engine 410 to identify inefficiencies and usage patterns across the service cloud 102. More specifically, the log/metric analyzer 502 identifies the types of transactions occurring across the different resources included in the service cloud 102. The log/metric analyzer 502 also identifies load imbalances across resources of the same resource type and identifies resources that are allocated to services and are under utilized by those services. In addition, the log/metric analyzer 502 determines whether any of the performance metrics collected by the logging and metrics engine 410 are significantly above or below pre-defined thresholds.

The log/metric analyzer 502 also performs trend analysis by correlating the operational details gathered by the logging and metrics engine 410 with templates and/or patterns specified by the templates/patterns 504. The templates/patterns 504 specify different trends that have been identified during the operation of the service cloud 102. The templates/patterns 504 may be associated with specific resources, resource types, and/or services. The templates/patterns 504 may specify trends that are associated with capacity spikes and drop-offs, events that are associated with imminent failures, etc. The templates/patterns 504 may be identified by the predictive engine 412 over time or may be specified by network/service administrators via the management platform 108 described above.

The operations layer 506 processes the analysis performed by the log/metric analyzer 502 to determine whether any remedial operations need to be performed by the predictive engine 412. A remedial operation is any action taken by the predictive engine 412 to correct inefficiencies and/or problems identified by the log/metric analyzer 502 or to avoid future inefficiencies and/or problems identified by log/metric analyzer based on the trend analysis. In some embodiments, the operations layer 506 determines whether remedial operations are needed based on cost-metrics and quality-metrics identified for a particular service interacting with the service cloud 102. In some cases, the cost of providing a better performing service may be greater than the cost-metric identified for the service. In such cases, remedial operations may not be performed. In other cases, the quality of a service may not increase proportionally to the cost of increasing the performance of the service. In such cases, remedial operations may not be performed.

As another example, based on the analysis performed by log/metric analyzer 502, the operations layer 502 determines that a certain event indicating a failure has occurred and, therefore, performs one or more pre-emptive actions to avoid that failure. As another example, based on the trend analysis performed by log/metric analyzer 502, the operations layer 502 predicts that the usage of a certain service will spike and, therefore, allocates extra resources to the service. As yet another example, based on the analysis performed by log/metric analyzer 502, the operations layer 502 determines that a particular resource is underperforming and, therefore, alerts the network/system administrator, via the management platform 108, to address the issue.

In such a manner, the predictive engine 412 monitors the performance of the service cloud 102 and the services 106 interacting with the service cloud 102. In monitoring the performance, the predictive engine 412 also develops knowledge with respect to correlations between certain patterns and trends and certain events. This knowledge is valuable in effectively scaling the resources allocated to services and allowing the service cloud 102 to be elastic and flexible.

Figure 6:
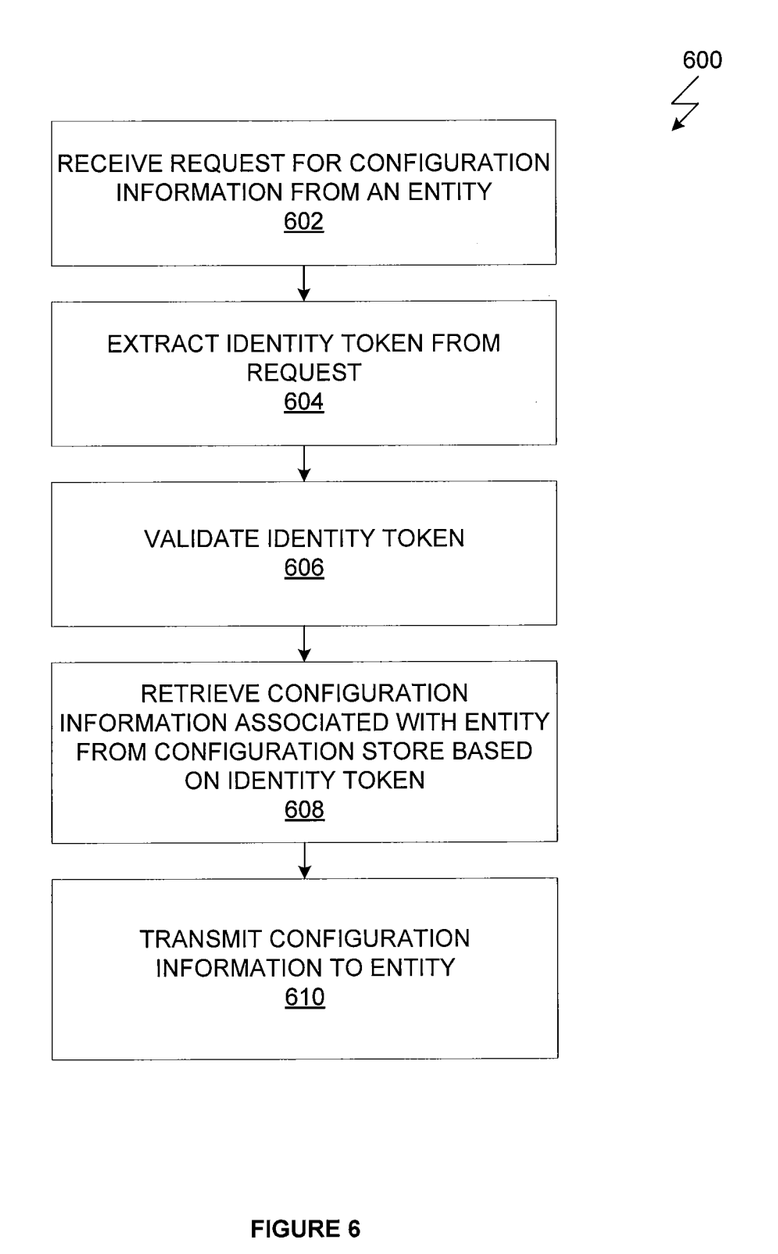
FIG. 6 is a flow diagram of method steps for configuring an entity within the cloud computing environment, according to one embodiment of the invention.

FIG. 6 is a flow diagram of method steps for configuring an entity within the cloud computing environment, according to one embodiment of the invention. Although the method steps are described in conjunction with the systems for FIGS. 1-5, persons skilled in the art will understand that any system configured to perform the method steps, in any order, is within the scope of the invention.

The method 600 begins at step 602, where the configuration engine 402 receives a request for configuration information from an entity. Again, for a particular entity, the associated configuration information specifies the different functionalities, properties and architectural dependencies associated with the entity. The configuration information associated with each entity is maintained and populated by the configuration engine 402 in the configuration store 406. The entity, therefore, does not need to maintain any configuration information.

At step 604, the configuration engine 402 extracts the identity token from the request. As previously described herein, each entity in the cloud computing environment 100 is associated with a unique identity token. When transmitting a request for configuration information, the entity includes the identity token associated with the entity in the request so the entity can be identified and authorized.

At step 606, the configuration engine 402 validates the identity token. To validate the identity token, the configuration engine 402 determines whether a record corresponding to the extracted identity token exists within the token store 404. The identity token is validated when a record corresponding to the identity token exists within the token store 404 and the entity associated with the identity token is authorized to receive configuration as specified by the record corresponding to the extracted identity.

At step 608, the configuration engine 402 retrieves the configuration information associated with the entity from the configuration store 406 based on the identity token. At step 610, the configuration engine 402 transmits the retrieved configuration information to the requesting entity.

Figure 7A:
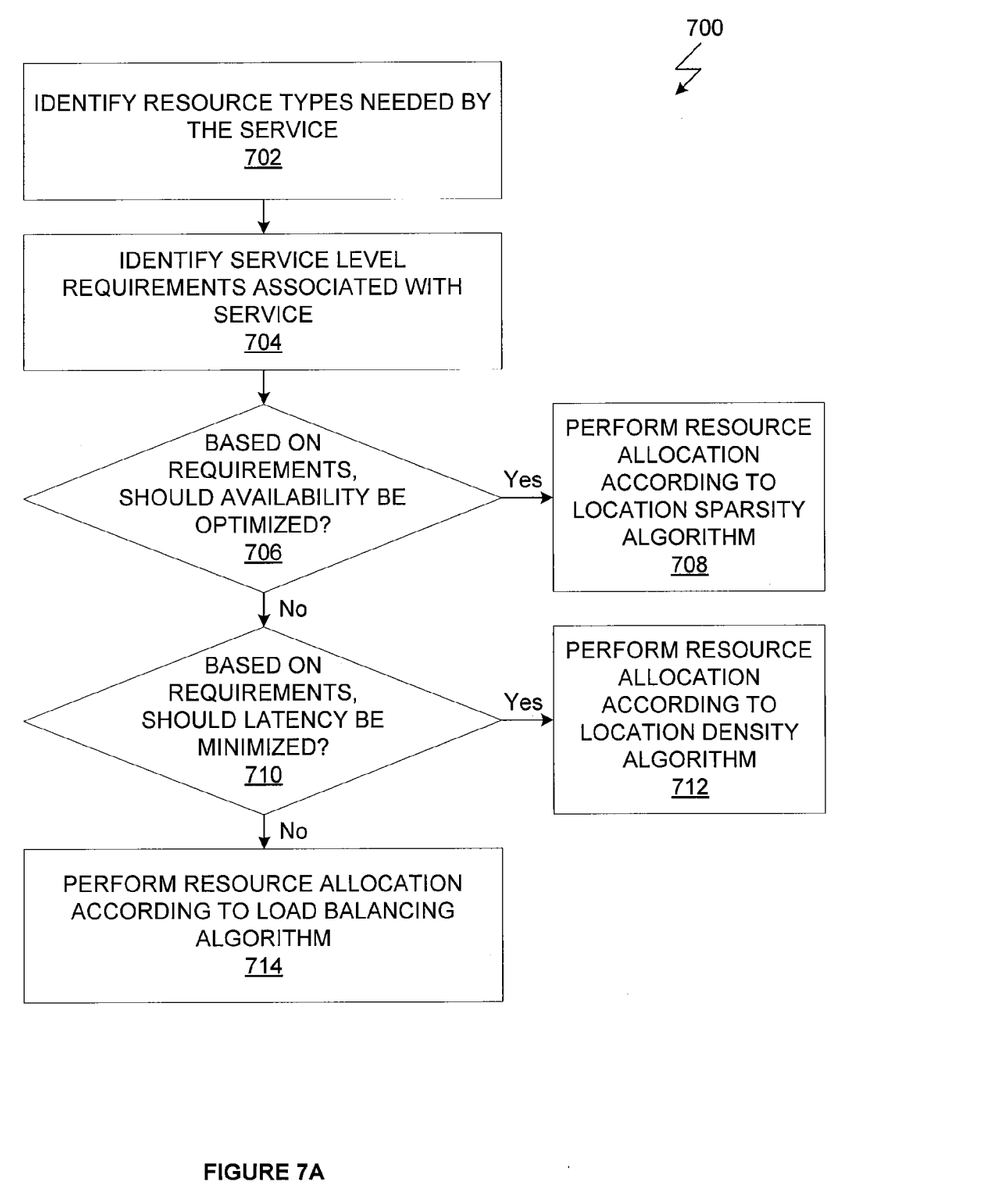
FIGS. 7A-7C set forth a flow diagram of method steps for allocating resources to a service, according to one embodiment of the invention.

FIG. 7A is a flow diagram of method steps for allocating resources to a service, according to one embodiment of the invention. Although the method steps are described in conjunction with the systems for FIGS. 1-5, persons skilled in the art will understand that any system configured to perform the method steps, in any order, is within the scope of the invention.

The method 700 begins at step 702, where the resource allocation engine 408 identifies the resource types needed by the service. In one embodiment, the resource types needed by the service are defined in system requirements and external dependencies specified by the service. At step 704, the resource allocation engine 408 identifies the performance requirements associated with the service. Again, the performance requirements associated with the service specify thresholds related to specific performance metrics that the service should meet when the service operates. The performance requirements may specify different thresholds for performance metrics such as data throughput, latency and resource utilization.

At step 706, the resource allocation engine 408 determines whether, based on the performance requirements, the availability of the resources should be optimized. If, at step 706, the resource allocation engine 408 determines that the availability of the resources should be optimized, then the method 700 proceeds to step 708. At step 708, the resource allocation engine 408 performs resource allocation according to a location sparsity algorithm. The details of one implementation of the location sparsity algorithm are described below in conjunction with FIG. 7B.

If, however, at step 706, the resource allocation engine 408 determines that the availability of the resources need not be optimized, then the method 700 proceeds to step 710. At step 710, the resource allocation engine 408 determines whether, based on the performance requirements, the latency across the service should be minimized. If, at step 710, the resource allocation engine 408 determines that the latency across the service should be minimized, then the method 700 proceeds to step 712. At step 712, the resource allocation engine 408 performs resource allocation according to a location density algorithm. The details of one implementation of the location density algorithm are described below in conjunction with FIG. 7C.

If, however, at step 706, the resource allocation engine 408 determines that the latency across the service need not be minimized, then the method 700 proceeds to step 714. At step 714, the resource allocation engine 408 performs resource allocation according to a load balancing algorithm. For the load balancing algorithm, the resource allocation engine 408 allocates resources such that resources associated with the same resource type have a balanced utilization levels.

Figure 7B:
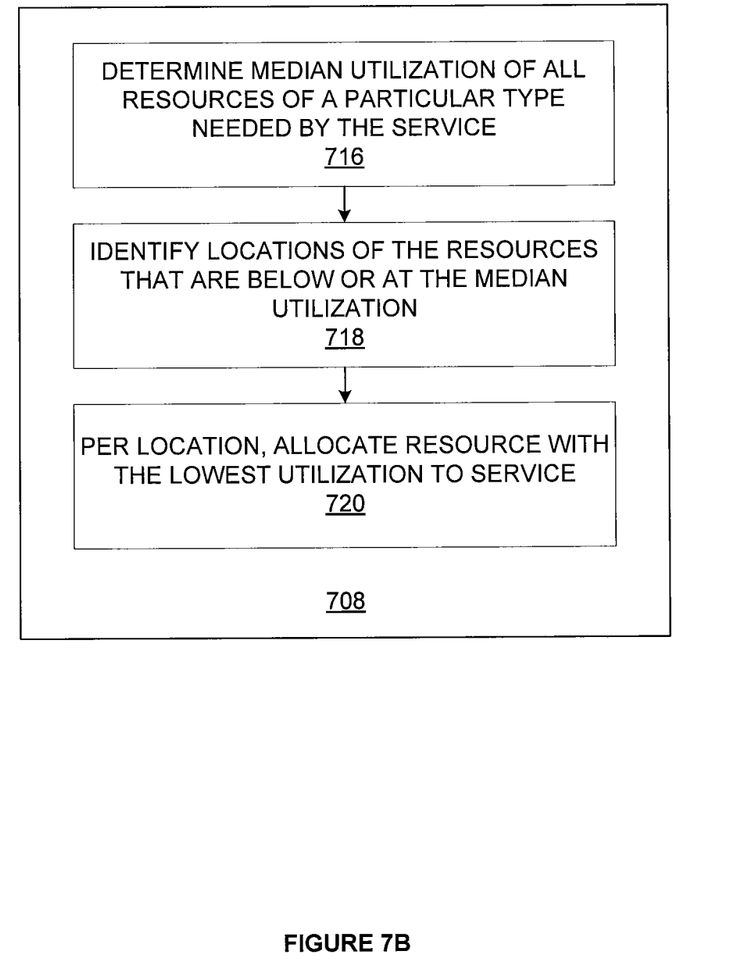

FIG. 7B is a flow diagram of method steps for allocating resources to a service according to a location sparsity algorithm, according to one embodiment of the invention. Although the method steps are described in conjunction with the systems for FIGS. 1-5, persons skilled in the art will understand that any system configured to perform the method steps, in any order, is within the scope of the invention.

At step 716, for a particular resource type needed by the service as identified at step 702, the resource allocation engine 408 determines the median utilization level across all resources associated with the particular resource type. At step 718, the resource allocation engine 408 identifies one or more locations of specific resources that are below or at the median utilization level determined at step 716. At step 720, per location, the resource with the lowest utilization is allocated to the service. Steps 716-720 are then repeated for each resource type needed by the service. In such a fashion, the locations of the resources allocated to the service are spread out, hence increasing the likelihood of high availability across the resources and, thus, the service.

Figure 7C:
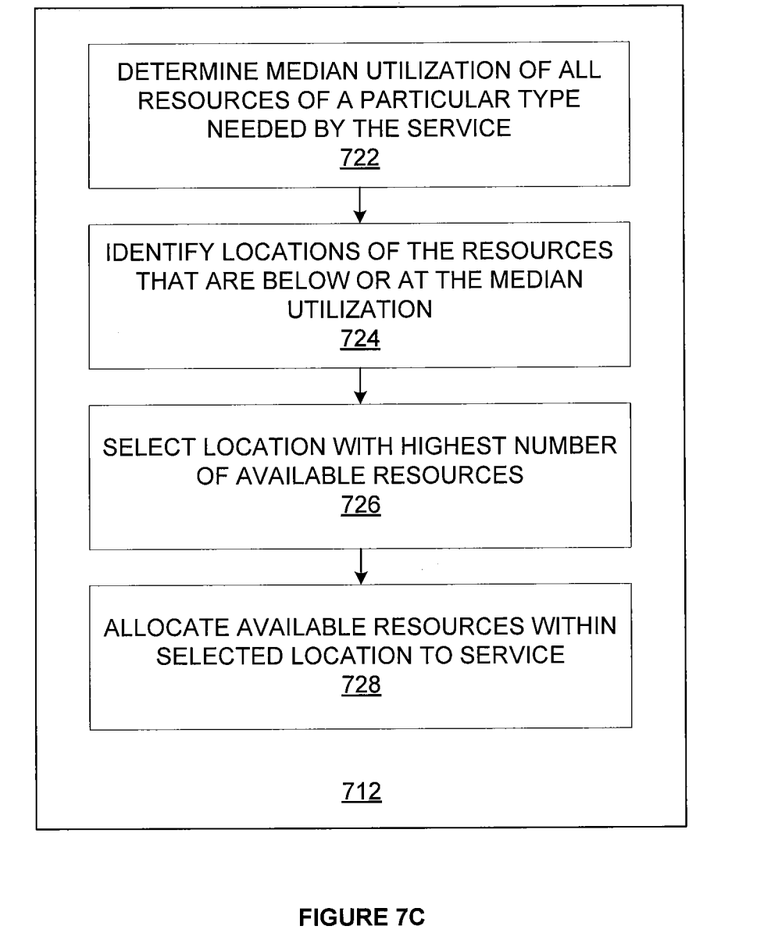

FIG. 7C is a flow diagram of method steps for allocating resources to a service according to a location density algorithm, according to one embodiment of the invention. Although the method steps are described in conjunction with the systems for FIGS. 1-5, persons skilled in the art will understand that any system configured to perform the method steps, in any order, is within the scope of the invention.

At step 722, for a particular resource type needed by the service as identified at step 702, the resource allocation engine 408 determines the median utilization level across all resources associated with the particular resource type. At step 724, the resource allocation engine 408 identifies one or more locations of specific resources that are below or at the median utilization level determined at step 716. At step 726, the resource allocation engine 408 selects the location with the largest number of resources that are below or at the median utilization level. At step 728, the resource allocation engine 408 allocates the resources in the selected location to the service. Steps 722-728 are then repeated for each resource type needed by the service. In such a fashion, the locations of the resources allocated to the service are co-located, hence increasing the likelihood of low latency across the resources and, thus, the service.

Figure 8:
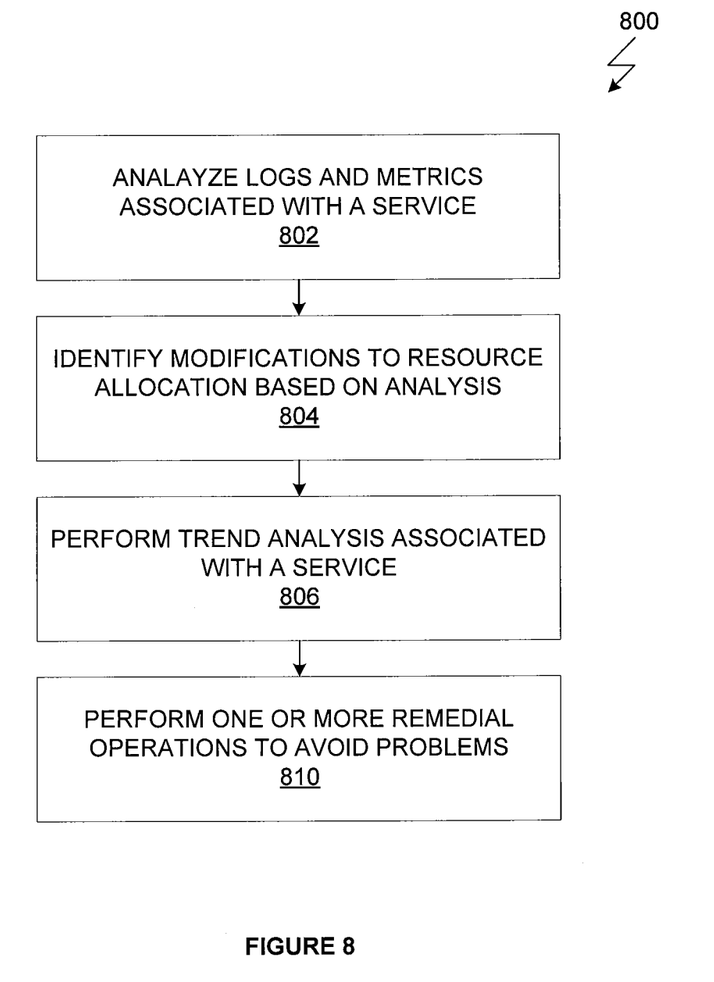
FIG. 8 is a flow diagram of method steps for configuring an entity within the cloud computing environment, according to one embodiment of the invention.

FIG. 8 is a flow diagram of method steps for configuring an entity within the cloud computing environment, according to one embodiment of the invention. Although the method steps are described in conjunction with the systems for FIGS. 1-5, persons skilled in the art will understand that any system configured to perform the method steps, in any order, is within the scope of the invention.

The method 800 begins at step 802, where the log/metric analyzer 502 included in the predictive engine 412 analyzes the operational details collected by the log/metrics engine 410 to identify inefficiencies and usage patterns across the operation of a service. More specifically, the log/metric analyzer 502 identifies the types of transactions occurring across the different resources allocated to the service. The log/metric analyzer 502 also identifies load imbalances across resources of the same resource type and identifies resources that are allocated to the service and are under utilized by those services. At step 804, based on this analysis, the operations layer 506 included in the predictive engine 412 identifies modifications to resource allocations to the different services to rectify the inefficiencies identified by the log/metric analyzer 502.

At step 806, the log/metric analyzer 502 also performs trend analysis by correlating the operational details gathered by the logging and metrics engine 410 with templates and/or patterns specified by the templates/patterns 504. The templates/patterns 504 specify different trends that have been identified during the operation of the service as well as the general operation of the service cloud 102. The templates/patterns 504 may specify trends that are associated with capacity spikes and drop-offs, events that are associated with imminent failures, etc. At step 808, the operations layer 506 processes the trend analysis performed by the log/metric analyzer 502 to determine whether any remedial operations need to be performed by the predictive engine 412 to avoid future problems, failures or inefficiencies.

Advantageously, the cloud computing environment described herein allows service developers to simply define the functionality of the service and describe the operating characteristics of the service. The allocation, configuration and management of the resources and the services are then autonomously performed by engines within the cloud computing environment.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A computer-implemented method to allocate one or more resources to a service that accesses a cloud computing environment, the method comprising:

receiving a request from the service to access configuration information for the service, wherein the request comprises an identity token uniquely identifying the service;

authenticating the service by determining whether a record corresponding to the identity token exists in a token store in the cloud computing environment;

retrieving, from a configuration store in the cloud computing environment, the configuration information for the service based on the identity token, wherein the configuration store stores configuration information for a plurality of services;

based on the configuration information of the service, determining one or more resource types necessary for the service to operate, wherein the configuration information comprises an attribute of an entity required to provide the service;

identifying one or more performance requirements specified by the service, wherein each performance requirement is associated with a different performance metric, wherein the configuration information is distinct from the one or more performance requirements; and allocating a set of resources included in the cloud computing environment to the service based on the one or more performance requirements, wherein at least a first resource in the set of resources is of a first resource type included in the one or more resource types.

2. The method of claim 1, wherein the one or more performance requirements specify that the availability of the service should be maximized, wherein the entity comprises each of: (i) an operating system resource, (ii) a virtual machine resource, and (iii) a database resource, wherein the attribute of the entity comprises each of: (i) a functionality, (ii) a property, and (iii) an architectural dependency of the entity.

3. The method of claim 2, wherein the set of resources is allocated such that the number of resources located in the same rack space is minimized.

4. The method of claim 3, wherein the one or more performance requirements specify that that transmission latency between the resources in the set of resources should be minimized, wherein a unique identity token is assigned to each instance of the service deployed in the cloud computing environment.

5. The method of claim 4, wherein the set of resources is allocated such that the number of resources located in the same rack space is maximized.

6. The method of claim 2, wherein the set of resources is allocated such that the processing load across the first resource and a second resource of first resource type is substantially balanced, wherein the set of resources includes at least one resource of each of the one or more resource types.

7. The method of claim 6, further comprising the step of monitoring the service operations to determine whether the one or more performance requirements are being met.

8. The method of claim 1, wherein the attribute of the one or more resource types comprises each of a functionality, a property, and an architectural dependency of the one or more resource types, wherein the one or more performance requirements specify that the availability of the service should be maximized, wherein the set of resources is allocated such that the number of resources located in the same rack space is minimized, wherein the one or more performance requirements specify that that transmission latency between the resources in the set of resources should be minimized, wherein the set of resources is allocated such that the number of resources located in the same rack space is maximized;
wherein the set of resources is allocated such that the processing load across the first resource and a second resource of first resource type is substantially balanced, wherein the set of resources includes at least one resource of each of the one or more resource types
wherein the method further comprises transmitting the configuration to the service to fulfill the request.

9. The method of claim 8, further comprising:
monitoring the service operations to determine whether the one or more performance requirements are being met; and
modifying the set of resources allocated to the service when the service operations do not meet at least one of the one or more performance requirements, wherein the one or more resource types necessary for the service to operate are determined by a configuration engine component of the cloud computing environment configured to facilitate service deployment;
wherein the configuration engine component is operatively connected to a resource engine allocation component, a logging metrics and engine component, and a predictive engine component of the cloud computing environment.

10. The method of claim 9, wherein the configuration engine generates the configuration information of the service when the service becomes a part of the cloud computing environment, wherein the configuration store comprises a hierarchy of configuration used to resolve a request specifying to provision the entity, wherein the cloud computing environment is operatively connected to a service framework layer configured to abstract service information pertaining to a portion of the plurality of resources to be allocated to the service, to facilitate service deployment of the service to the cloud computing environment, wherein a unique identity token is assigned to each instance of the service deployed in the cloud computing environment;
wherein the cloud computing environment comprises a plurality of resources configured to support one or more of services accessing the cloud computing environment, wherein the plurality of resources includes the set of resources;
wherein the configuration engine is configured to manage and distribute the configuration information, wherein the configuration information is related to the plurality of resources within the cloud computing environment; and
wherein the resource allocation engine configured to allocate the portion of the plurality of resources to the service based on at least a portion of the configuration information.

11. A non-transitory computer-readable storage medium storing instructions that, when executed by a processor, cause the processor to allocate one or more resources to a service that accesses a cloud computing environment, by performing the steps of:
receiving a request from the service to access configuration information for the service, wherein the request comprises an identity token uniquely identifying the service;
authenticating the service by determining whether a record corresponding to the identity token exists in a token store in the cloud computing environment;
retrieving, from a configuration store in the cloud computing environment, the configuration information for the service based on the identity token, wherein the configuration store stores configuration information for a plurality of services;
based on the configuration information of the service, determining one or more resource types necessary for the service to operate, wherein the configuration information comprises an attribute of an entity required to provide the service;
identifying one or more performance requirements specified by the service, wherein each performance requirement is associated with a different performance metric, wherein the configuration information is distinct from the one or more performance requirements; and
allocating a set of resources included in the cloud computing environment to the service based on the one or more performance requirements, wherein at least a first resource in the set of resources is of a first resource type included in the one or more resource types.

12. The computer-readable storage medium of claim 11, wherein the one or more performance requirements specify that the availability of the service should be maximized, wherein the entity comprises each of: (i) an operating system resource, (ii) a virtual machine resource, and (iii) a database resource, wherein the attribute of the entity comprises each of: (i) a functionality, (ii) a property, and (iii) an architectural dependency of the entity.

13. The computer-readable storage medium of claim 12, wherein the set of resources is allocated such that the number of resources located in the same rack space is minimized.

14. The computer-readable storage medium of claim 13, wherein the one or more performance requirements specify that that transmission latency between the resources in the set of resources should be minimized, wherein a unique identity token is assigned to each instance of the service deployed in the cloud computing environment.

15. The computer-readable storage medium of claim 14, wherein the set of resources is allocated such that the number of resources located in the same rack space is maximized.

16. The computer-readable storage medium of claim 15, wherein the set of resources is allocated such that the processing load across the first resource and a second resource of first resource type is substantially balanced.

17. The computer-readable storage medium of claim 16, further comprising the step of monitoring the service operations to determine whether the one or more performance requirements are being met.

18. The computer-readable storage medium of claim 17, further comprising the step of modifying the set of resources allocated to the service when the service operations do not meet at least one of the one or more performance requirements.

19. A computer system, comprising:
   a processor; and
   a memory containing a program, which when executed by the processor, performs an operation comprising:
      receiving a request from the service to access configuration information for the service, wherein the request comprises an identity token uniquely identifying the service;
      authenticating the service by determining whether a record corresponding to the identity token exists in a token store in the cloud computing environment;
      retrieving, from a configuration store in the cloud computing environment, the configuration information for the service based on the identity token, wherein the configuration store stores configuration information for a plurality of services;
      based on the configuration information of the service, determining one or more resource types necessary for the service to operate, wherein the configuration information comprises an attribute of an entity provisioned to provide the service;
      identify one or more performance requirements specified by the service, wherein each performance requirement is associated with a different performance metric, wherein the configuration information is distinct from the one or more performance requirements; and
      allocate a set of resources included in the cloud computing environment to the service based on the one or more performance requirements, wherein at least a first resource in the set of resources is of a first resource type included in the one or more resource types.

20. The computer system of claim 19, wherein the set of resources includes at least one resource of each of the one or more resource types, wherein the entity comprises each of: (i) an operating system resource, (ii) a virtual machine resource, and (iii) a database resource, wherein the attribute of the entity comprises each of: (i) a functionality, (ii) a property, and (iii) an architectural dependency of the entity.

* * * * *